US010271389B2

(12) United States Patent
Rutgers

(10) Patent No.: US 10,271,389 B2
(45) Date of Patent: Apr. 23, 2019

(54) CONVERTER WITH CONTROL LOOP

(71) Applicant: SIGNIFY HOLDING B.V., Eindhoven (NL)

(72) Inventor: Andrew Ulrich Rutgers, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 1 day.

(21) Appl. No.: 15/501,444

(22) PCT Filed: Aug. 3, 2015

(86) PCT No.: PCT/EP2015/067847
§ 371 (c)(1),
(2) Date: Feb. 3, 2017

(87) PCT Pub. No.: WO2016/020334
PCT Pub. Date: Feb. 11, 2016

(65) Prior Publication Data
US 2017/0231036 A1 Aug. 10, 2017

(30) Foreign Application Priority Data

Aug. 8, 2014 (EP) .................................... 14180285

(51) Int. Cl.
*H05B 41/282* (2006.01)
*H05B 33/08* (2006.01)
*H02M 1/42* (2007.01)
(Continued)

(52) U.S. Cl.
CPC ......... *H05B 33/08* (2013.01); *H05B 33/0815* (2013.01); *H05B 33/0845* (2013.01);
(Continued)

(58) Field of Classification Search
CPC ........ H02M 1/42; H02M 1/4216; H02M 5/10; H02M 2001/0012; H02M 1/4225;
(Continued)

(56) References Cited

U.S. PATENT DOCUMENTS 6,084,786 A * 7/2000 Rozman ................. H02M 1/12
363/48
6,307,765 B1 10/2001 Choi
(Continued)

FOREIGN PATENT DOCUMENTS

DE 102009017139 A1 10/2010
EP 0106672 A1 4/1984
(Continued)

*Primary Examiner* — Harry Behm
*Assistant Examiner* — Lorena Bruner
(74) *Attorney, Agent, or Firm* — Akarsh P. Belagodu

(57) ABSTRACT

Converters (1) comprise switches (14) for in response to control signals controlling amplitudes of converter output signals and comprise control loops for in response to detections of the amplitudes of the converter output signals producing the control signals. The control loops comprise circuits (21-23) for in response to simple detections of the amplitudes counting a first number of first time-intervals for which the amplitudes are above or below reference amplitudes, for transforming counting results into the control signals having control values, and for in response to the first number of first time-intervals being equal to/larger than a reference number overruling the control values and producing control signals having first or second limit values. Complex detections of the amplitudes are no longer necessary. Simple detectors (3, 4) may detect the amplitudes of the output signals and amplitudes or phases of input signals or rectified versions thereof and produce binary signals destined for binary inputs of micro-controllers (2) comprising the circuits (21-23).

15 Claims, 4 Drawing Sheets

(51) Int. Cl.
*H02P 21/14* (2016.01)
*H05B 37/02* (2006.01)
*H05B 41/28* (2006.01)

(52) U.S. Cl.
CPC ........... *H05B 41/2824* (2013.01); *H02M 1/42* (2013.01); *H02P 21/14* (2013.01); *H05B 37/02* (2013.01); *H05B 41/28* (2013.01); *Y02B 20/346* (2013.01)

(58) Field of Classification Search
CPC ........ H02M 3/157; G05F 1/14; Y02B 70/126; Y02B 80/112; Y02P 80/112
USPC .......................................................... 363/13
See application file for complete search history.

(56) References Cited

U.S. PATENT DOCUMENTS

| | | |
|---|---|---|
| 2005/0265058 A1 | 12/2005 | Stevanovic et al. |
| 2007/0058402 A1* | 3/2007 | Shekhawat ............. H02M 1/42 363/89 |
| 2010/0013395 A1 | 1/2010 | Archibald et al. |
| 2012/0236612 A1* | 9/2012 | Uno ........................ H02M 1/36 363/126 |
| 2013/0010508 A1* | 1/2013 | Courtel ............... H02M 1/4225 363/84 |
| 2014/0126246 A1 | 5/2014 | Djenguerian et al. |
| 2014/0292220 A1* | 10/2014 | Trattler ................. H02M 3/157 315/287 |

FOREIGN PATENT DOCUMENTS

| | | |
|---|---|---|
| FR | 2491230 A3 | 4/1982 |
| WO | 02058217 A2 | 7/2002 |
| WO | 2007039860 A2 | 4/2007 |
| WO | 2008012714 A2 | 1/2008 |
| WO | 2008012722 A2 | 1/2008 |
| WO | 2010118944 A1 | 10/2010 |
| WO | 2013152374 A2 | 10/2013 |

* cited by examiner

US 10,271,389 B2

CONVERTER WITH CONTROL LOOP

CROSS-REFERENCE TO PRIOR APPLICATIONS

This application is the U.S. National Phase application under 35 U.S.C. § 371 of International Application No. PCT/EP2015/067847, filed on Aug. 3, 2015 which claims the benefit of European Patent Application No. 14180285.0, filed on Aug. 8, 2014. These applications are hereby incorporated by reference herein.

FIELD OF THE INVENTION

The invention relates to a converter for converting an input signal into an output signal. The invention further relates to a device, to a method, to a computer program product and to a medium. Examples of such a converter are boost converters.

BACKGROUND OF THE INVENTION

WO 2013/152374 A2 discloses a power factor correction circuit comprising a converter with a switch for in response to a control signal controlling an amplitude of an output signal and with a control loop for in response to a detection of the amplitude of the output signal producing the control signal. Thereto, the control loop comprises a circuit that receives a precise analog value or a precise digital value of the amplitude of the output signal and in response produces the control signal.

SUMMARY OF THE INVENTION

It is an object of the invention to provide an improved converter. It is a further object of the invention to provide a device, an improved method, a computer program product and a medium.

According to a first aspect, a converter is provided for converting an input signal into an output signal, the converter comprising a switch for in response to a control signal controlling an amplitude of the output signal, the converter further comprising a control loop for in response to a detection of the amplitude of the output signal producing the control signal, the control loop comprising
  a first circuit for in response to the detection of the amplitude of the output signal counting a first number of first time-intervals for which the amplitude of the output signal is above or below a reference amplitude,
  a second circuit for transforming a counting result from the first circuit into the control signal having a control value, and
  a third circuit for in response to the first number of first time-intervals being equal to or larger than a reference number overruling the second circuit and producing the control signal having a first or second limit value.

The converter converts an input signal into an output signal. The converter comprises one or more switches for in response to a control signal controlling an amplitude of the output signal. The control signal may be a signal that controls the one or more switches directly or may be a signal that controls the one or more switches indirectly via an interface. The control of the amplitude of the output signal may comprise a more direct control of the amplitude of the output signal or may comprise a control of an amplitude of another output signal or of an amount of power supplied via the output signal that both result in a control of the amplitude of the output signal. The converter further comprises a control loop for in response to a detection of the amplitude of the output signal producing the control signal. Thereto, the control loop comprises a first circuit for in response to the detection of the amplitude of the output signal counting a first number of first time-intervals for which the amplitude of the output signal is above (or below) a reference amplitude. The control loop further comprises a second circuit for transforming a counting result from the first circuit into the control signal having a control value. The control loop further comprises a third circuit for in response to the first number of first time-intervals being equal to or larger than a reference number overruling the second circuit and producing the control signal having a first or second limit value.

By having introduced a control loop with a first circuit that counts a first number of first time-intervals for which the (for example instantaneous) amplitude of the output signal is above (or below) a reference amplitude, by having provided the control loop with a second circuit that transforms a counting result into the control signal having a (regular) control value, and by having provided the control loop with a third circuit that overrules the second circuit and produces the control signal having a first or second (overruling) limit value in case the first number of first time-intervals is equal to or larger than a reference number, it is no longer necessary to use a precise analog value or a precise digital value of the amplitude of the output signal as an input to the control loop, which is a great improvement.

The first, second and third circuits form part of a feedback part of the control loop and may be realized in the form of separate circuits, in the form of parts of a larger circuit, or in the form of functions performed in one or more circuits.

An embodiment of the converter is defined by the control signal having the first or second limit value resulting in the amplitude of the output signal getting minimal or maximal respectively. In case the first number of first time-intervals, for which the amplitude of the output signal is above the reference amplitude, is equal to or larger than the reference number, the amplitude of the output signal should get a minimum value. In case the first number of first time-intervals, for which the amplitude of the output signal is below the reference amplitude, is equal to or larger than the reference number, the amplitude of the output signal should get a maximum value.

An embodiment of the converter is defined by the reference number comprising a total number of first time-intervals situated within a second time-interval. The counting, the transforming and the overruling are preferably performed per second time-interval comprising at least ten first time-intervals, more preferably at least one hundred first time-intervals etc.

An embodiment of the converter is defined by the output signal being a DC voltage signal, the input signal being a DC voltage signal comprising predefined points or an AC voltage signal comprising predefined points, and the second time-interval being a time-interval situated between two predefined points. Predefined points such as for example zero values in a DC voltage signal and zero crossings in an AC voltage signal are well suited for defining the second time-interval. Other predefined points such as predefined levels are not to be excluded.

An embodiment of the converter is defined by the counting result being proportional to a division result equal to the first number of first time-intervals divided by the total number of first time-intervals. Such a division result may then have a value between zero and one, in case the first number of first time-intervals is at most equal to the reference number.

An embodiment of the converter is defined by the division result being adapted into an error result. Such an error result may be derived by subtracting one half from the division result, the error result may then have a value between minus one half and plus one half.

An embodiment of the converter is defined by the second circuit being configured to perform a control on the error result and to scale the error result, the controlled and scaled error result representing the control signal having the control value. Usually, a control on the error result such as for example a proportional and integral control or a proportional and integral and derivative control may have its own control loop such as a feedback loop within the second circuit, and the scaling may be performed via another control loop such as another feedback loop within the second circuit. Other kinds of second circuits configured to perform another kind of control on the error result such as for example another feedback-based-control are not to be excluded.

An embodiment of the converter is defined by the first circuit, the second circuit and the third circuit being parts of a micro-controller, and the first time-interval being a cycle of the micro-controller or another time-interval generated in, by or via the micro-controller. The cycle of a micro-controller or another time-interval generated in, by or via the micro-controller are well suited for defining the first time-interval. A micro-controller can be any kind of controller and any kind of processor.

An embodiment of the converter is defined by the control loop further comprising a first detector for detecting the amplitude of the output signal and for producing a first binary signal destined for a first binary input of the micro-controller. The first detector may for example comprise a comparator or an operational amplifier etc. and forms part of the feed-back part of the control loop. A first detector in the form of a comparator is for example disclosed in WO 02/058217 A2. The amplitude of the output signal may for example be an instantaneous amplitude.

An embodiment of the converter is defined by the control loop further comprising a second detector for detecting an amplitude or a phase of the input signal or a rectified version thereof and for producing a second binary signal destined for a second binary input of the micro-controller. The second detector may for example comprise a comparator or an operational amplifier or a phase detector etc. and forms part of a feed-forward part of the control loop. The amplitude of the input signal may for example be an instantaneous amplitude.

An embodiment of the converter is defined by the converter comprising a power factor corrector. A power factor corrector is for example disclosed in WO 2013/152374 A2.

According to a second aspect, a device is provided comprising the converter as defined above and further comprising a load for receiving the output signal from the converter. Examples of such a device are lamps, other consumer products and professional products.

According to a third aspect, a method is provided for controlling a converter for converting an input signal into an output signal, the converter comprising a switch for in response to a control signal controlling an amplitude of the output signal, the converter further comprising a control loop for in response to a detection of the amplitude of the output signal producing the control signal, the method comprising the steps of, in the control loop in response to the detection of the amplitude of the output signal counting a first number of first time-intervals for which the amplitude of the output signal is above or below a reference amplitude, transforming a counting result from the first step into the control signal having a control value, and in response to the first number of first time-intervals being equal to or larger than a reference number overruling the second step and producing the control signal having a first or second limit value.

According to a fourth aspect, a computer program product is provided for performing the steps of the method as defined above.

According to a fifth aspect, a medium is provided for storing and comprising the computer program product as defined above.

An insight is that analog-to-digital converters in control loops are to be avoided. A basic idea is that a first number of first time-intervals should be counted for which the amplitude of the output signal is above (or below) a reference amplitude and that a counting result should be used as a basis for controlling the converter.

A problem to provide an improved converter has been solved. A further advantage is that the control loop is simple, low cost and robust.

These and other aspects of the invention will be apparent from and elucidated with reference to the embodiments described hereinafter.

DETAILED DESCRIPTION OF EMBODIMENTS

Figure 1:
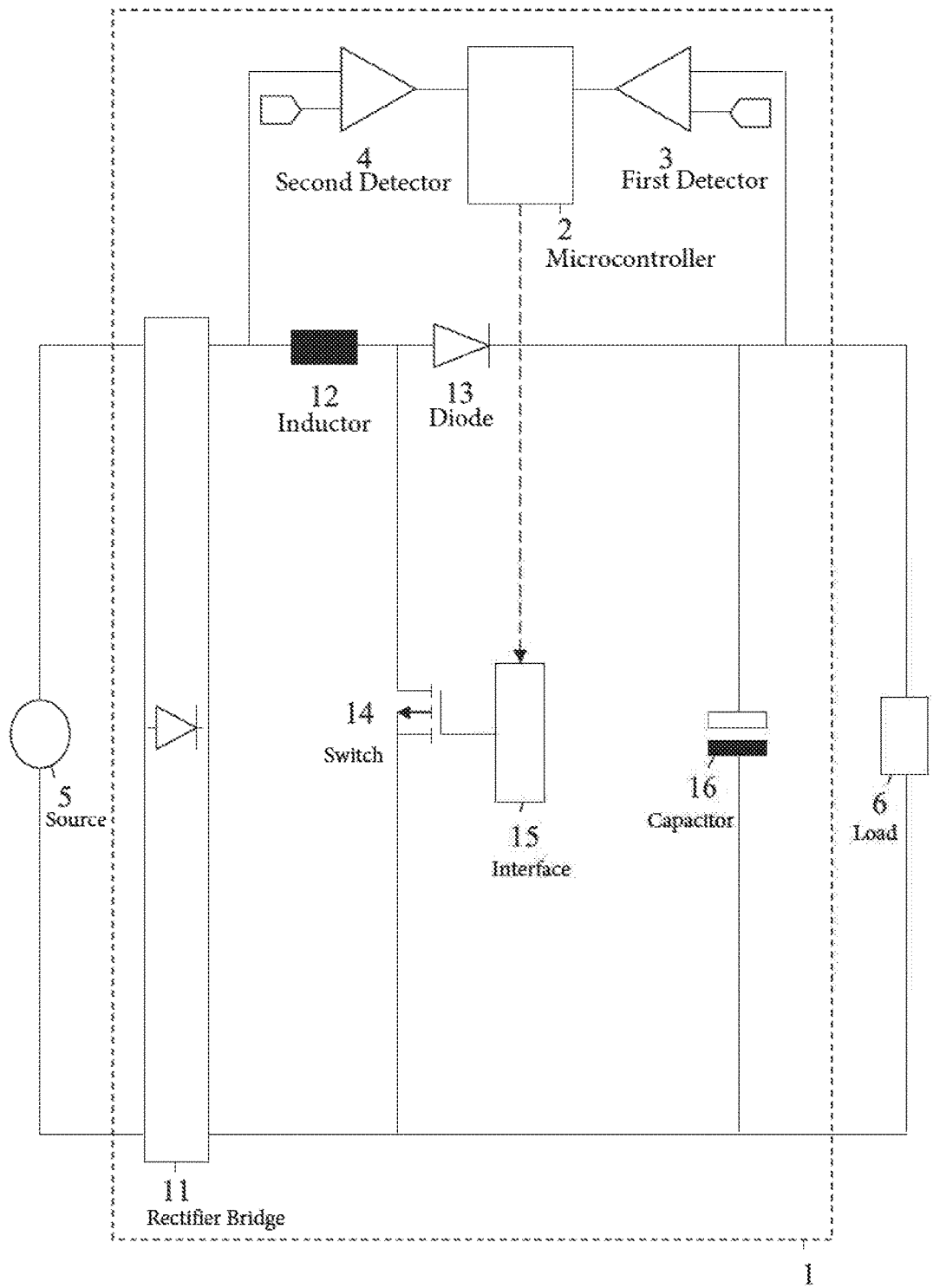
FIG. 1 shows an embodiment of a converter.

In the FIG. 1, an embodiment of a converter 1 is shown. Inputs of the converter 1 are coupled to outputs of a source 5 such as mains. First and second outputs of the converter 1 are coupled to a load 6. The converter 1 may comprise a rectifier bridge 11 that for example comprises four diodes. Inputs of the rectifier bridge 11 form the inputs of the converter 1. Alternatively, the rectifier bridge 11 may be situated outside the converter 1, between the source 5 and the converter 1. A first output of the rectifier bridge 11 is coupled to a first side of an inductor 12. A second side of the inductor 12 is coupled to a first side (anode) of a diode 13 and to a first main contact of a switch 14 here in the form of a transistor. A second side (cathode) of the diode 13 is coupled to a first side of a capacitor 16 and forms the first output of the converter 1. A second output of the rectifier bridge 11 is coupled to a second main contact of the switch 14 and to a second side of the capacitor 16 and forms the second output of the converter 1.

The converter 1 further comprises a control loop 2-4 comprising a micro-controller 2 for controlling the switch 14 possibly via an interface 15. A first input of the micro-controller 2 is coupled to an output of a first detector 3 such as a comparator or an operational amplifier etc. A first input of the first detector 3 is coupled to the first output of the converter 1, and a second input of the first detector 3 receives a signal representing a reference amplitude. A second input of the micro-controller 2 is coupled to an output of a second detector 4 such as a comparator or an operational amplifier or a phase detector etc. A first input of the second detector 4 is coupled to the first output of the rectifier bridge 11, and a second input of the second detector 4 receives a signal representing another reference amplitude. Alternatively, the first input of the second detector 4 may be coupled to an input of the rectifier bridge 11.

So, the converter 1 converts an input signal from the source 5 into an output signal destined for the load 6 and comprises a switch 14 for in response to a control signal controlling an amplitude of the output signal. The converter 1 further comprises a control loop for in response to a detection of the amplitude of the output signal producing the control signal. This control loop may for example comprise a micro-controller 2.

Figure 2:
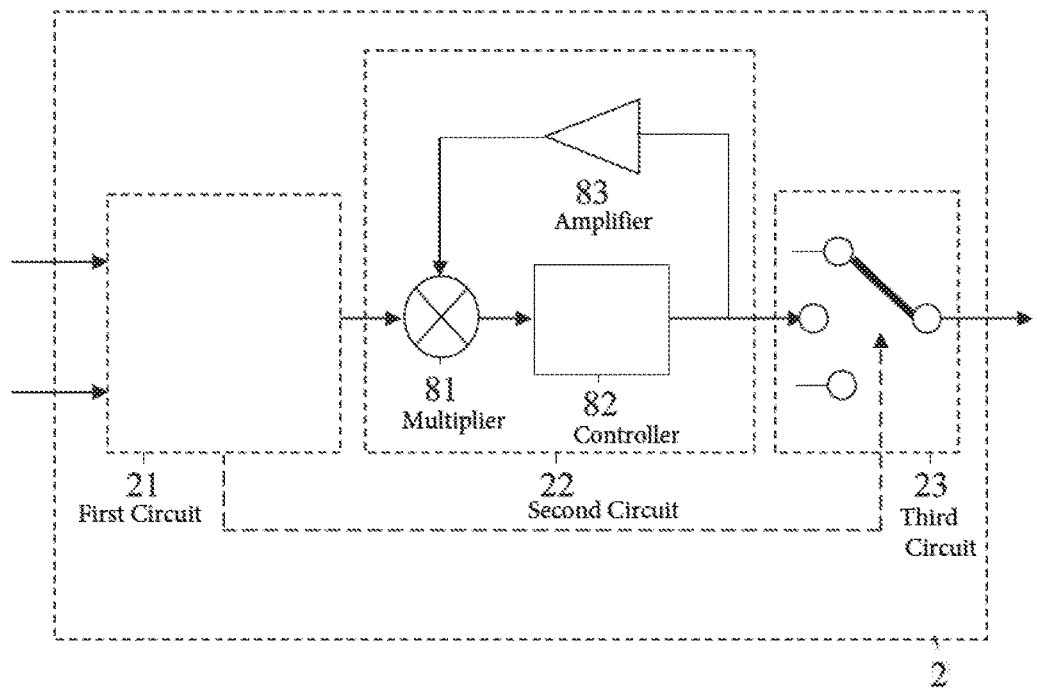
FIG. 2 shows an embodiment of a micro-controller.

In the FIG. 2, an embodiment of a micro-controller 2 is shown. The micro-controller 2 comprises a first circuit 21 for in response to the detection of the amplitude of the output signal, as for example performed by the first detector 3, counting a first number of first time-intervals for which the amplitude of the output signal is above or below a reference amplitude. The micro-controller 2 comprises a second circuit 22 for transforming a counting result from the first circuit 21 into the control signal having a control value. The micro-controller 2 comprises a third circuit 23 for in response to the first number of first time-intervals being equal to or larger than a reference number overruling the second circuit 22 and producing the control signal having a first or second limit value.

Figure 3:
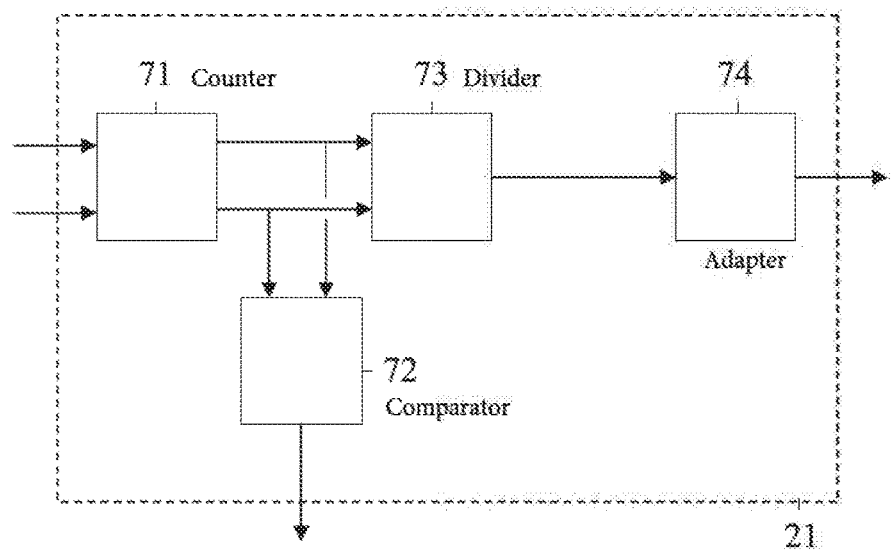
FIG. 3 shows an embodiment of a first circuit.

In the FIG. 3, an embodiment of the first circuit 21 is shown. The first circuit 21 comprises a counter 71 or a counting function for counting the first number of first time-intervals for which the amplitude of the output signal is above or below the reference amplitude. The counter 71 or the counting function either knows how many first time-intervals (a total number of first time-intervals) are situated within a fixed second time-interval, in which case the second detector 4 can be left out, or derives this information from the output of the second detector 4. The first circuit 21 comprises a comparator 72 or a comparing function for comparing the first number of first time-intervals with the reference number that for example comprises a total number of first time-intervals situated within the second time-interval. A comparison result from the comparator 72 or the comparing function is used for controlling the third circuit 23.

The first circuit 21 comprises a divider 73 or a dividing function for dividing the first number of first time-intervals by the total number of first time-intervals situated within the second time-interval. A division result may then have a value between zero and one. The first circuit 21 comprises an adapter 74 or an adapting function for adapting the division result into an error result. Such an error result may be derived by subtracting one half from the division result. The error result may then have a value between minus one half and plus one half. This error result is supplied to the second circuit 22.

Going back to the FIG. 2, the second circuit 22 comprises a multiplier 81 or a multiplying function for multiplying the error result and an output signal from an amplifier 83 or an amplifying function. The second circuit 22 comprises a (proportional and integral and possibly derivative) controller 82 or a (proportional and integral and possibly derivative) controlling function that receives an output signal from the multiplier 81 or the multiplying function and that supplies an input signal to the amplifier 83 or the amplifying function and to the third circuit 23. This way, the error result from the first circuit 21 is controlled (via the controller 82) and scaled (via the multiplier 81 and the amplifier 83) and the controlled and scaled error result representing the control signal having the control value is supplied to the third circuit 23. Other kinds of (feedback-based) controllers 82 and other kinds of (feedback-based) controlling functions are not to be excluded. The third circuit 23 for example comprises a selector or a selecting function that in response to the comparison result from the first circuit 21 either selects the control signal having the control value and originating from the second circuit 22 to be used (left middle terminal of the third circuit 23) or selects the control signal having a first or second limit value to be used. This control signal having the first or second limit value may result in the amplitude of the output signal getting minimal or maximal, i.e. a minimum amplitude (resulting from the first limit value at the left upper terminal of the third circuit 23) or a maximum amplitude (resulting from the second limit value at the left lower terminal of the third circuit 23).

In view of the FIG. 1-3, in case the first number of first time-intervals, for which the amplitude of the output signal is above the reference amplitude, is equal to or larger than the reference number, the amplitude of the output signal should get a minimum value. In case the first number of first time-intervals, for which the amplitude of the output signal is below the reference amplitude, is equal to or larger than the reference number, the amplitude of the output signal should get a maximum value.

Preferably, the counting, the transforming and the overruling are performed per second time-interval comprising at least ten first time-intervals, more preferably at least one hundred first time-intervals etc. Usually, the output signal may be a DC voltage signal, the input signal may be a DC voltage signal comprising predefined points such as for example zero values or an AC voltage signal comprising predefined points such as for example zero crossings, and the second time-interval may then be a time-interval situated between two predefined points such as two zero values or two zero-crossings. These zero values and zero crossings in the input signal are well suited for defining the second time-interval. The second time-interval may for example have a duration of 10 msec. and the first time-interval may then have a duration of 1 msec. or 0.1 msec. etc.

Figure 4:
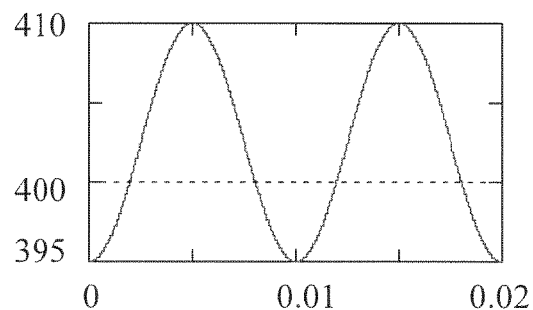
FIG. 4 shows a first waveform.

In the FIG. 4, a first waveform is shown (horizontal axis: time in seconds, vertical axis: voltage in Volt). This first waveform is the output signal of the converter 1 and an input signal supplied to the first detector 3. Further shown is a reference amplitude at 400 Volt.

Figure 5:
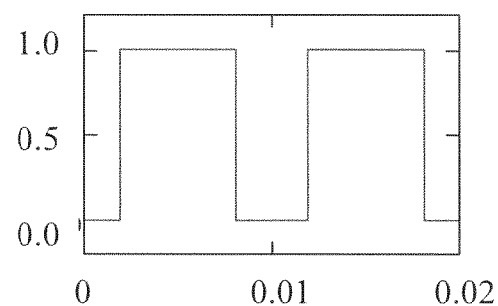
FIG. 5 shows a second waveform.

In the FIG. 5, a second waveform is shown (horizontal axis: time in seconds, vertical axis: voltage in Volt). This second waveform is the output signal of the first detector 3 and an input signal supplied to the micro-controller 2. This second waveform is "one" for the output signal of the converter being larger than the reference amplitude (400 Volt as shown in the FIG. 4) and "zero" otherwise.

Figure 6:
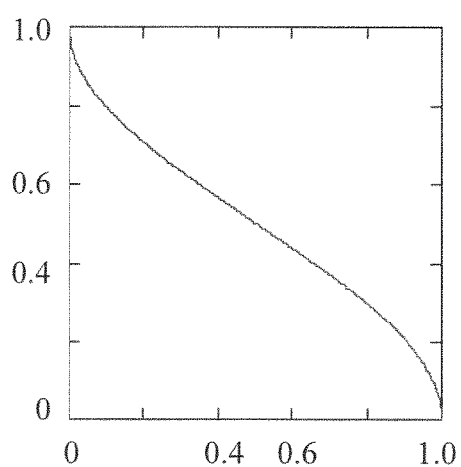
FIG. 6 shows a third waveform.

In the FIG. 6, a third waveform is shown (horizontal axis: proportion of the sine wave of the FIG. 4 above the reference amplitude, vertical axis: proportion of the time that the sine wave is above the reference amplitude). This third waveform represents a function present in the first circuit 21.

The control signal defines for example an on-time of the switch 14. A control value of the on-time may then be a regular value for increasing or decreasing the amplitude of the output signal in the form of the DC voltage signal to a relatively small extent. A first or second limit value of the on-time may then be an extreme value for giving the amplitude of the output signal in the form of the DC voltage signal a minimum or maximum value. A minimum on-time will result in the output signal getting a maximum amplitude, and a maximum on-time will result in the output signal getting a minimum amplitude, for this particular converter 1. Alternatively, the control signal may define a frequency of the converter 1 or an amplitude of an output current or an amount of output power etc. Other kinds of converters will be possible too and are not to be excluded.

Preferably, the first circuit 21, the second circuit 22 and the third circuit 23 are parts of a micro-controller 2, without having excluded other kinds of embodiments. The first time-interval may be a cycle of the micro-controller 2 or another time-interval generated in, by or via the micro-controller 2. Advantageously, when using a micro-controller 2, the first detector 3 that detects the amplitude of the output signal can produce a first binary signal destined for a first binary input of the micro-controller 2, and the second detector 4 that detects an amplitude or a phase of the input signal or a rectified version thereof can produce a second binary signal destined for a second binary input of the micro-controller 2. Micro-controllers 2 with binary inputs are relatively low cost. The first and second detectors 3, 4 can be relatively simple and relatively low cost detectors.

First and second elements can be coupled directly without a third element being in between and can be coupled indirectly via the third element.

Summarizing, converters 1 comprise switches 14 for in response to control signals controlling amplitudes of converter output signals and comprise control loops for in response to detections of the amplitudes of the converter output signals producing the control signals. The control loops comprise circuits 21-23 for in response to simple detections of the amplitudes counting a first number of first time-intervals for which the amplitudes are above or below reference amplitudes, for transforming counting results into the control signals having control values, and for in response to the first number of first time-intervals being equal to/larger than a reference number overruling the control values and producing control signals having first or second limit values. Complex detections of the amplitudes are no longer necessary. Simple detectors 3, 4 may detect the amplitudes of the output signals and amplitudes or phases of input signals or rectified versions thereof and produce binary signals destined for binary inputs of micro-controllers 2 comprising the circuits 21-23.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A converter for converting an input signal from a source into an output signal destined for a load, the converter comprising a switch for, in response to a control signal, controlling an amplitude of the output signal, the converter further comprising a control loop for, in response to a detection of the amplitude of the output signal, producing the control signal, the control loop comprising:
   a first circuit for, in response to the detection of the amplitude of the output signal, counting a first number of first time-intervals for which the amplitude of the output signal is above or below a reference amplitude,
   a second circuit for controlling and scaling a counting result from the first circuit into the control signal having a control value, and
   a third circuit for, in response to the first number of first time-intervals being equal to or larger than a reference number, overruling the second circuit and producing the control signal having a first or second limit value.

2. The converter as defined in claim 1, the control signal having the first or second limit value resulting in the amplitude of the output signal getting minimal or maximal respectively.

3. The converter as defined in claim 1, the reference number comprising a total number of first time-intervals situated within a second time-interval.

4. The converter as defined in claim 3, the output signal being a DC voltage signal, the input signal being a DC voltage signal comprising predefined points or an AC voltage signal comprising predefined points, and the second time-interval being a time-interval situated between two predefined points.

5. The converter as defined in claim 3, the counting result being proportional to a division result equal to the first number of first time-intervals divided by the total number of first time-intervals.

6. The converter as defined in claim 5, the division result being adapted into an error result.

7. The converter as defined in claim 6, the second circuit being configured to perform a control on the error result and to scale the error result, the controlled and scaled error result representing the control signal having the control value.

8. The converter as defined in claim 1, the first circuit, the second circuit and the third circuit being parts of a micro-controller, and the first time-interval being a cycle of the micro-controller or another time-interval generated in, by or via the micro-controller.

9. The converter as defined in claim 8, the control loop further comprising
   a first detector for detecting the amplitude of the output signal and for producing a first binary signal destined for a first binary input of the micro-controller.

10. The converter as defined in claim 8, the control loop further comprising
    a second detector for detecting an amplitude or a phase of the input signal or a rectified version thereof and for producing a second binary signal destined for a second binary input of the micro-controller.

11. The converter as defined in claim 1, the converter comprising a power factor corrector.

12. A device comprising the converter as defined in claim 1 and further comprising a load for receiving the output signal from the converter.

13. A method for controlling a converter for converting an input signal from a source into an output signal destined for a load, the converter comprising a switch for in response to a control signal controlling an amplitude of the output signal, the converter further comprising a control loop for in response to a detection of the amplitude of the output signal producing the control signal, the method comprising the steps of, in the control loop
    in response to the detection of the amplitude of the output signal counting a first number of first time-intervals for which the amplitude of the output signal is above or below a reference amplitude, controlling and scaling a counting result from the first step into the control signal having a control value, and in response to the first number of first time-intervals being equal to or larger than a reference number overruling the second step and producing the control signal having a first or second limit value.

14. A computer program product for performing the steps of the method as defined in claim 13.

15. A medium for storing and comprising the computer program product as defined in claim 14.

* * * * *